(12) United States Patent
Schurig et al.

(10) Patent No.: US 7,036,333 B2
(45) Date of Patent: May 2, 2006

(54) INTEGRATED DRAIN TUBE PLUMBING TRAY

(75) Inventors: Steven J. Schurig, Sterling Heights, MI (US); Michel Genereux, Royal Oak, MI (US)

(73) Assignee: Denso International America, Inc., Southfield, MI (US)

( * ) Notice: Subject to any disclaimer, the term of this patent is extended or adjusted under 35 U.S.C. 154(b) by 217 days.

(21) Appl. No.: 10/748,423

(22) Filed: Dec. 30, 2003

(65) Prior Publication Data

US 2005/0138945 A1     Jun. 30, 2005

(51) Int. Cl.
*F25B 47/00* (2006.01)
*B60H 1/32* (2006.01)

(52) U.S. Cl. .................. 62/279; 62/244; 62/239; 454/147; 454/150

(58) Field of Classification Search .................. 62/239, 62/244, 279; 165/42, 43; 454/60, 147, 150, 454/160
See application file for complete search history.

(56) References Cited

U.S. PATENT DOCUMENTS

| 4,956,979 | A | * | 9/1990 | Burst et al. .................... 62/244 |
| 5,481,885 | A | * | 1/1996 | Xavier et al. ............... 62/259.2 |
| 5,545,085 | A | * | 8/1996 | Danieau ...................... 454/124 |
| 5,836,380 | A | * | 11/1998 | Takesita et al. ............... 165/43 |
| 6,196,308 | B1 | | 3/2001 | Halligan |
| 6,382,305 | B1 | * | 5/2002 | Sano ........................... 165/43 |
| 6,644,559 | B1 | | 11/2003 | Kondo et al. |
| 6,962,195 | B1 | * | 11/2005 | Smith et al. ................ 165/202 |

* cited by examiner

*Primary Examiner*—Melvin Jones
(74) *Attorney, Agent, or Firm*—Harness, Dickey & Pierce, PLC

(57) ABSTRACT

A mounting arrangement for an automobile heating core includes a dash panel defining a boundary between a passenger compartment and an engine compartment. The heater core is positioned in the passenger compartment. An inlet pipe extends between the dash panel and the heating core and delivers fluid to the heating core. An outlet pipe extends between the heating core and the dash panel and delivers fluid away from the heating core. A fluid collection member is positioned in the passenger compartment and arranged to collect fluid leaking from the inlet and outlet pipes.

20 Claims, 6 Drawing Sheets

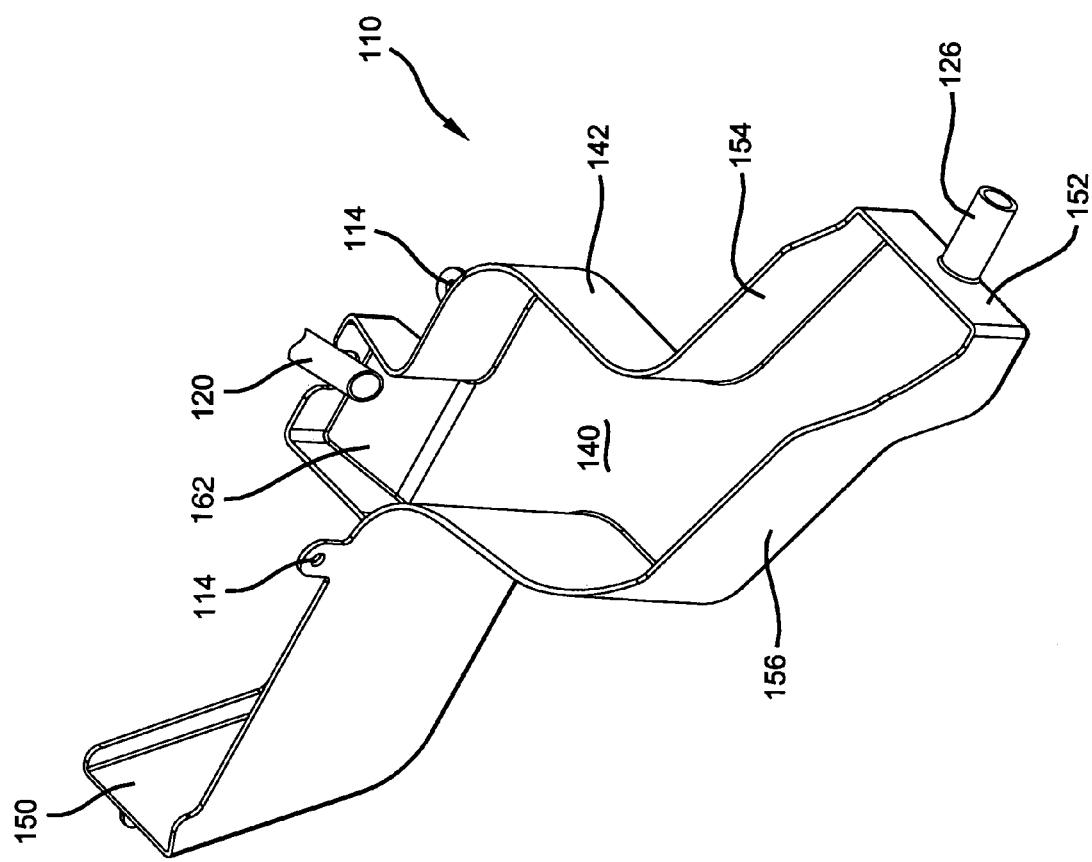

INTEGRATED DRAIN TUBE PLUMBING TRAY

FIELD OF THE INVENTION

The present invention relates to HVAC systems in vehicles and more particularly to a tray for cooperating with heater core plumbing in the passenger compartment of the vehicle.

BACKGROUND OF THE INVENTION

In automotive vehicles, it is common to have a climate control system located within an instrument panel which provides heated or cooled air to occupants through dash panel defrost air outlets, instrument panel venting air outlets and floor directed air outlets. These traditional climate control systems often include a heater core that performs heat exchange between the engine coolant, which is heated by the engine, and the cool air in the cabin/outside environment, in order to provide warm air to the passenger cabin.

A vehicle dash panel defines a boundary between an engine compartment and a passenger compartment. Typically, the heater core is located in the passenger compartment of the vehicle in the HVAC case. An inlet pipe directs coolant from the vehicle engine to the heater core by a coolant pump. An outlet pipe carries fluid away from the heater core back to the engine. The inlet and outlet pipes connecting the heater core generally extend from the vehicle dash panel to the heater core in the HVAC case of the passenger compartment.

Sometimes the fluid in the inlet and outlet pipes is very hot. In some HVAC configurations, portions of the inlet and outlet pipes are exposed in the passenger compartment. As a result, a passenger may inadvertently come in contact with the pipes. Moreover, in the event of a fluid leak from the inlet or outlet pipes, the fluid may drip onto an extremity of a passenger such as a leg, foot or toe.

SUMMARY OF THE INVENTION

A mounting arrangement for an automobile heating core includes a dash panel defining a boundary between a passenger compartment and an engine compartment. The heater core is positioned in the passenger compartment. An inlet pipe extends between the dash panel and the heating core and delivers fluid to the heating core. An outlet pipe extends between the heating core and the dash panel and delivers fluid away from the heating core. A fluid collection member is positioned in the passenger compartment and arranged to collect fluid leaking from the inlet and outlet pipes.

According to additional features, an evaporator is disposed in the passenger compartment and includes a drain tube extending therefrom for delivering condensation away from the evaporator and to the fluid collection member. The fluid collection member includes a planar portion and a wall extending around a perimeter thereof. The wall includes an opening for accommodating the drain tube of the evaporator. The fluid collection member includes an outlet port for draining fluid away from the fluid collection member. The outlet port extends through the dash panel for directing fluid from the passenger compartment to the engine compartment. The fluid collection member is disposed generally below the passenger compartment pipes whereby gravity influences leaking fluid into the fluid collection member.

The fluid collection member is positioned between a vehicle occupant and the inlet and outlet pipes to preclude contact of the occupant and the inlet and outlet pipes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is an upper perspective view of the drain tray.

DETAILED DESCRIPTION OF THE PREFERRED EMBODIMENTS

The following description of the preferred embodiment(s) is merely exemplary in nature and is in no way intended to limit the invention, its application, or uses.

Figure 1:
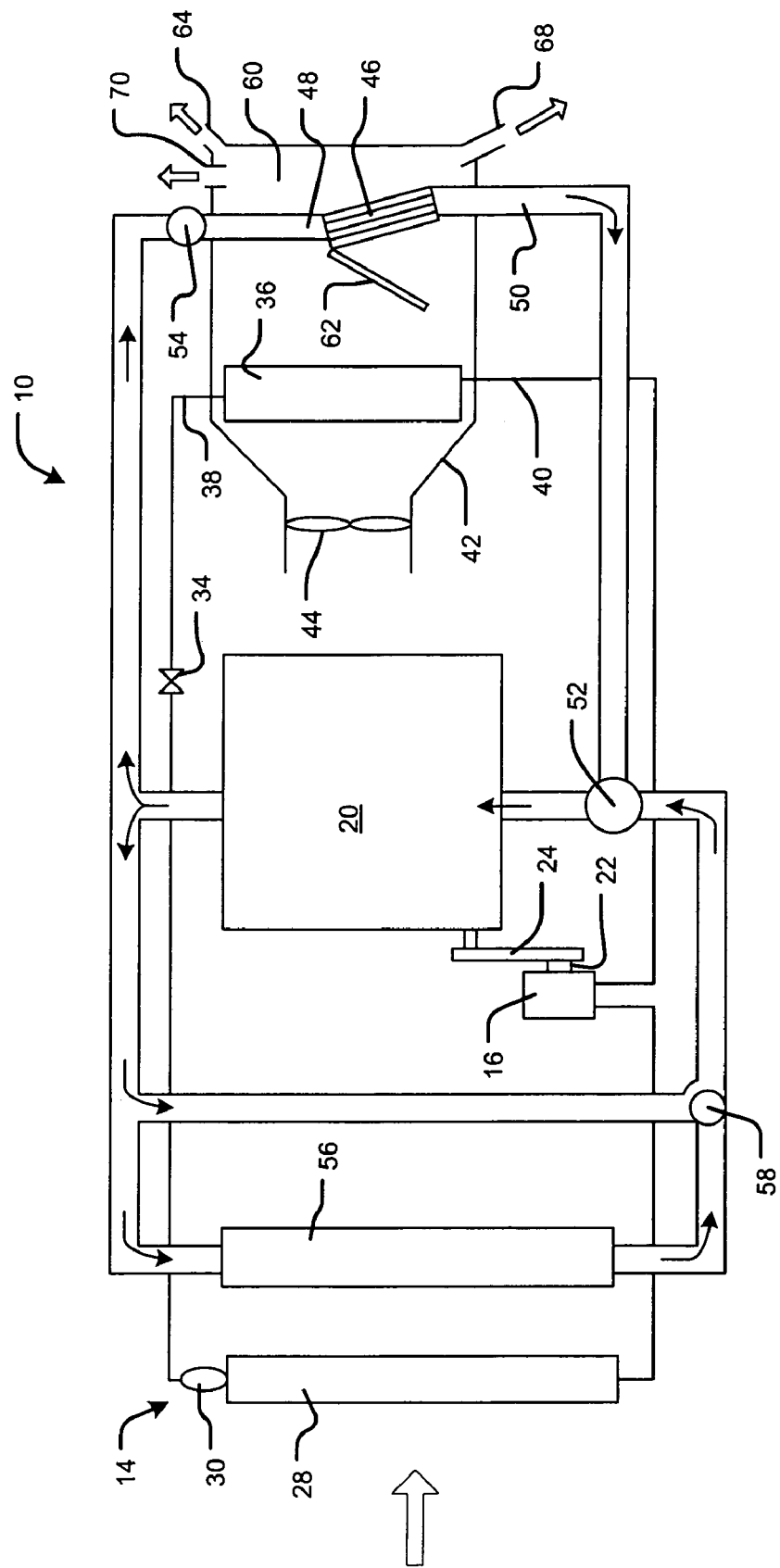
FIG. 1 is a functional block diagram of an HVAC system of a vehicle.

With initial reference to FIG. 1, a block diagram of a vehicle HVAC system according to the present teachings is shown and generally identified at reference 10. A refrigeration cycle R of the vehicle HVAC system 10 includes an air-cooling system 14. The air-cooling system 14 includes a compressor 16 which draws, compresses, and discharges a refrigerant. The power of a vehicle engine 20 is transmitted to the compressor 16 through pulleys 22 and a belt 24.

As is well known, the vehicle engine 20 drives not only the air conditioning compressor 16 but also such auxiliaries as a generator, a hydraulic pump for a power steering unit, and a coolant pump via belts and other power transmitting devices.

In the refrigeration cycle R, the compressor 16 discharges a superheated gas refrigerant of high temperature and high pressure, which flows into a condenser 28. Here, heat exchange is performed with the outside air sent by a cooling fan (not shown), so that the refrigerant is cooled for condensation. The refrigerant condensed in this condenser 28 then flows into a receiver 30, in which the refrigerant is separated into a gas and a liquid. A redundant liquid refrigerant in the refrigeration cycle R is stored inside the receiver 30.

The liquid refrigerant from the receiver 30 is decompressed by an expansion valve 34 into a gas-liquid double phase state of low pressure refrigerant. The low pressure refrigerant from the expansion valve 34 flows into an evaporator 36 by way of an inlet pipe 38. The evaporator 36 is arranged inside an HVAC case 42 of the vehicle air conditioning system 14. The low pressure refrigerant flowing into the evaporator 36 absorbs heat from the air inside the HVAC case 42 for evaporation. An outlet pipe 40 of the evaporator 36 is connected to the suction side of the compressor 16, so that the cycle components mentioned above constitute a closed circuit.

The HVAC case 42 forms a ventilation duct through which air conditioning air is sent into the passenger compartment. The HVAC case 42 contains a fan 44 which is arranged on the upstream side of the evaporator 36. An inside/outside air switch box (not shown) is arranged on the suction side of the fan 44 (the left side in FIG. 1). The air inside the passenger compartment (inside air) or the air outside the passenger compartment (outside air) switched and introduced through the inside/outside air switch box is sent into the HVAC case 42 by the fan 44.

The HVAC case 42 accommodates, on the downstream side of the evaporator 36, a hot water heater core (heat exchanger) 46. The heater core 46 includes an inlet pipe 48 and an outlet pipe 50. Hot water (coolant) of the vehicle engine 20 is directed to the heater core 46 through the inlet pipe 48 by a water pump 52. A water valve 54 controls the flow volume of engine coolant supplied to the heater core 46. A radiator 56 and a thermistor 58 further cooperate to control the temperature of the coolant.

A bypass channel 60 is formed beside the hot water heater core 46. An air mix door 62 is provided to adjust the volume ratio between warm air and cool air that passes through the hot water heater core 46 and the bypass channel 60, respectively. The air mix door 62 adjusts the temperature of the air blown into the passenger compartment by adjusting the volume ratio between the warm air and cool air.

Additionally, a face outlet 64, a foot outlet 68, and a defroster outlet 70 are formed at the downstream end of the HVAC case 42. The face outlet 64 directs air toward the upper body portions of passengers, the foot outlet 68 directs air toward the feet of the passengers, and the defroster outlet 70 directs air toward the internal surface of a windshield. The outlets 64, 68 and 70 are opened and closed by an outlet mode doors (not shown). The air mix door 62 and the outlet mode doors mentioned above are driven by such electric driving devices such as servo motors via linkages or the like.

Figure 2:
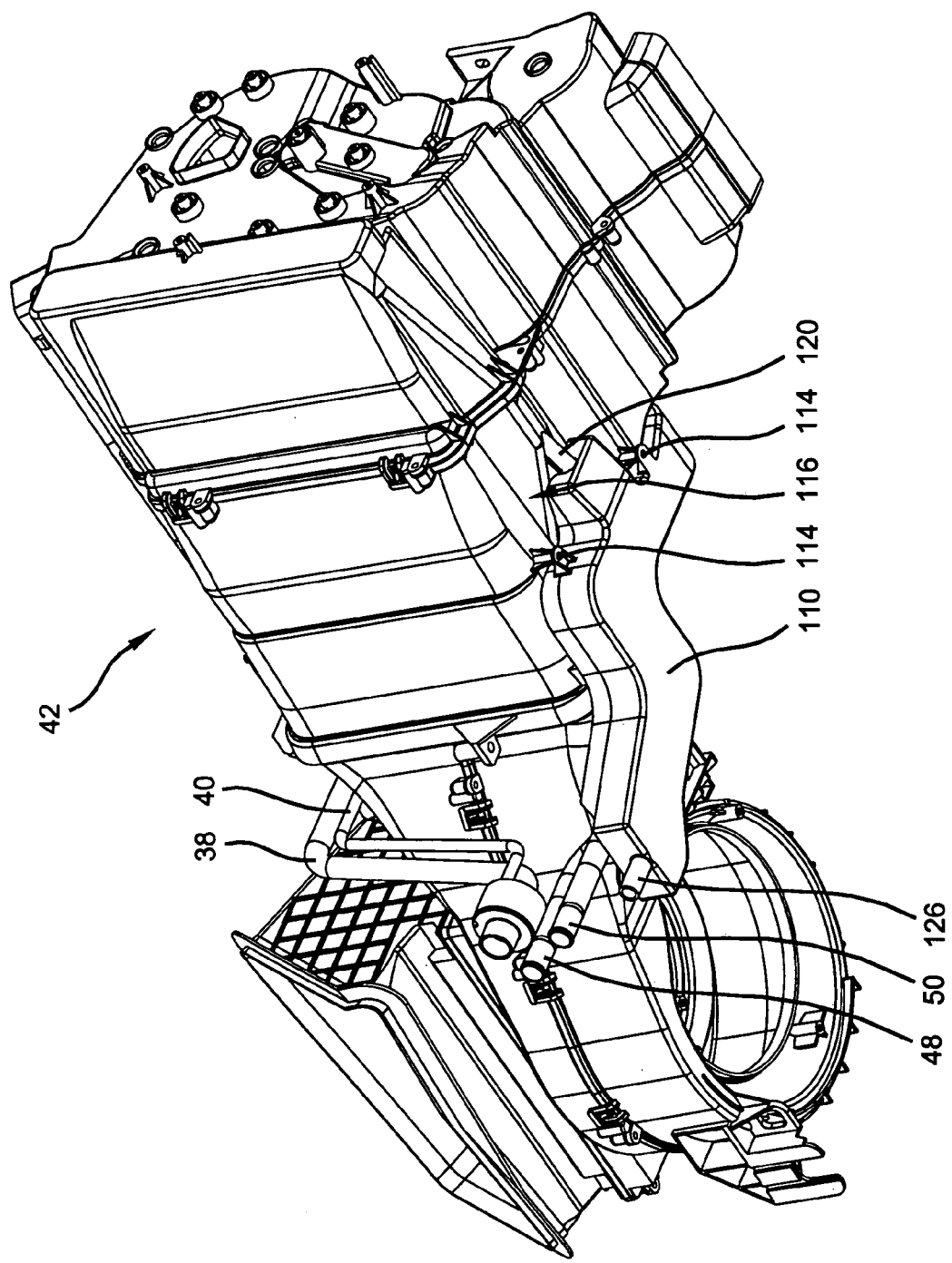
FIG. 2 is a lower perspective view of an HVAC case incorporating a drain tray according to the present teachings.
Figure 3:
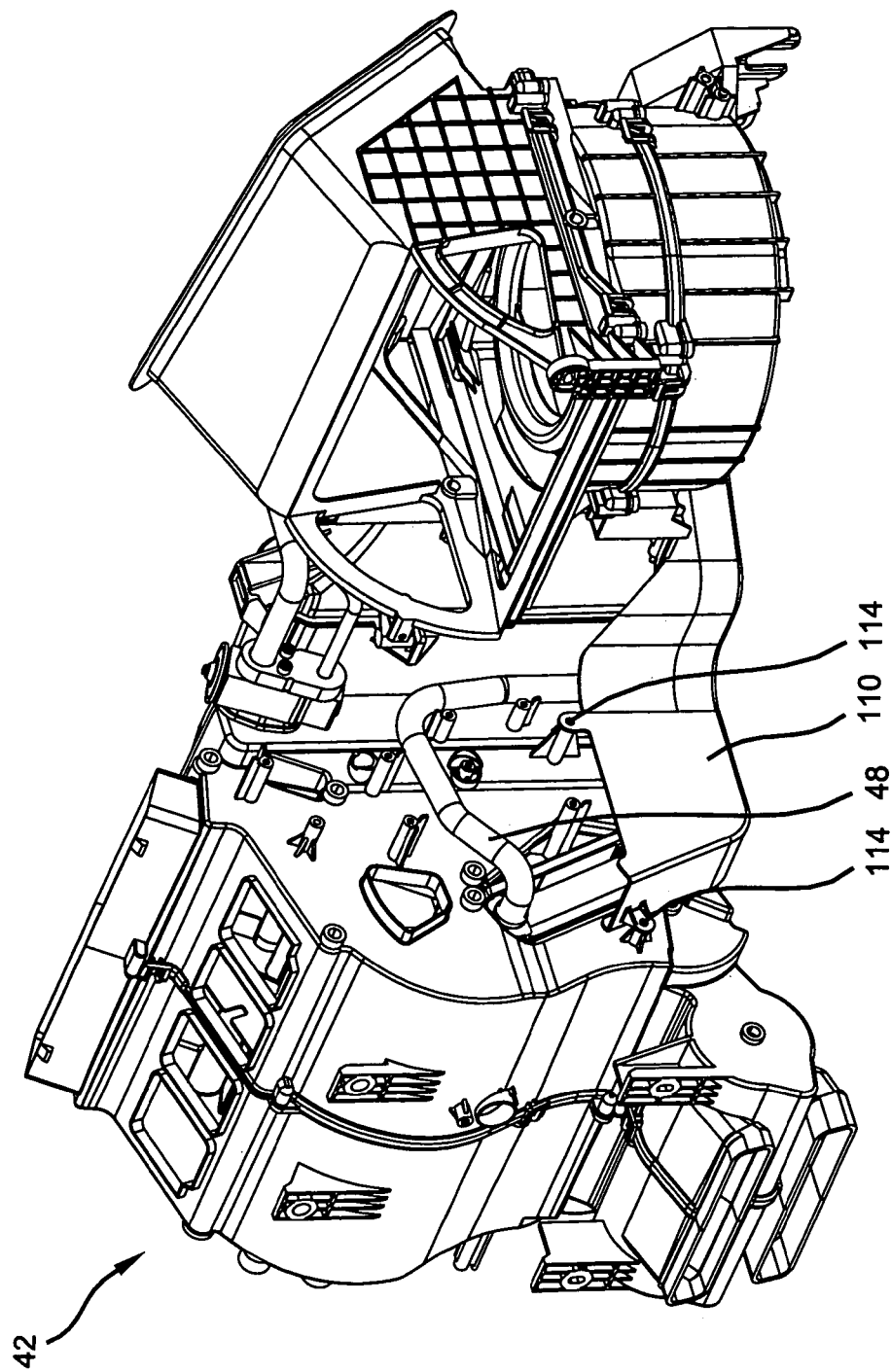
FIG. 3 is a lower perspective view of an HVAC case incorporating the drain tray according to the present teachings.

With further reference now to FIGS. 2 and 3, a fluid collection member or drain tray 110 according to the present teachings is shown in an installed position with the HVAC case 42. The drain tray 110 is coupled to the HVAC case 42 at attachment points 114 by conventional fasteners (not specifically shown). The drain tray 110 is positioned on an underside 116 of the HVAC case 42 below the heater core inlet pipe 48 and the heater core outlet pipe 50. The structure of the drain tray 110 is configured to collect fluid leaking from the inlet and outlet pipes 48 and 50 of the heater core 46 in the event of a fluid leak. The drain tray 110 is positioned below the inlet and outlet pipes 48 and 50 to allow gravity to urge fluid into the drain tray 110 in the event of a fluid leak.

A drain tube 120 extending from the evaporator 36 directs condensation generated by the evaporator 36 into the drain tray 110. The drain tray 110 is also configured to collect any fluid leaking from the inlet pipe 38 and the outlet pipe 40 of the evaporator 36 in the event of a leak. An outlet port 126 is arranged on the drain tray 110 and directs any collected fluid from the passenger compartment to the engine compartment as will be described in further detail.

Figure 4:
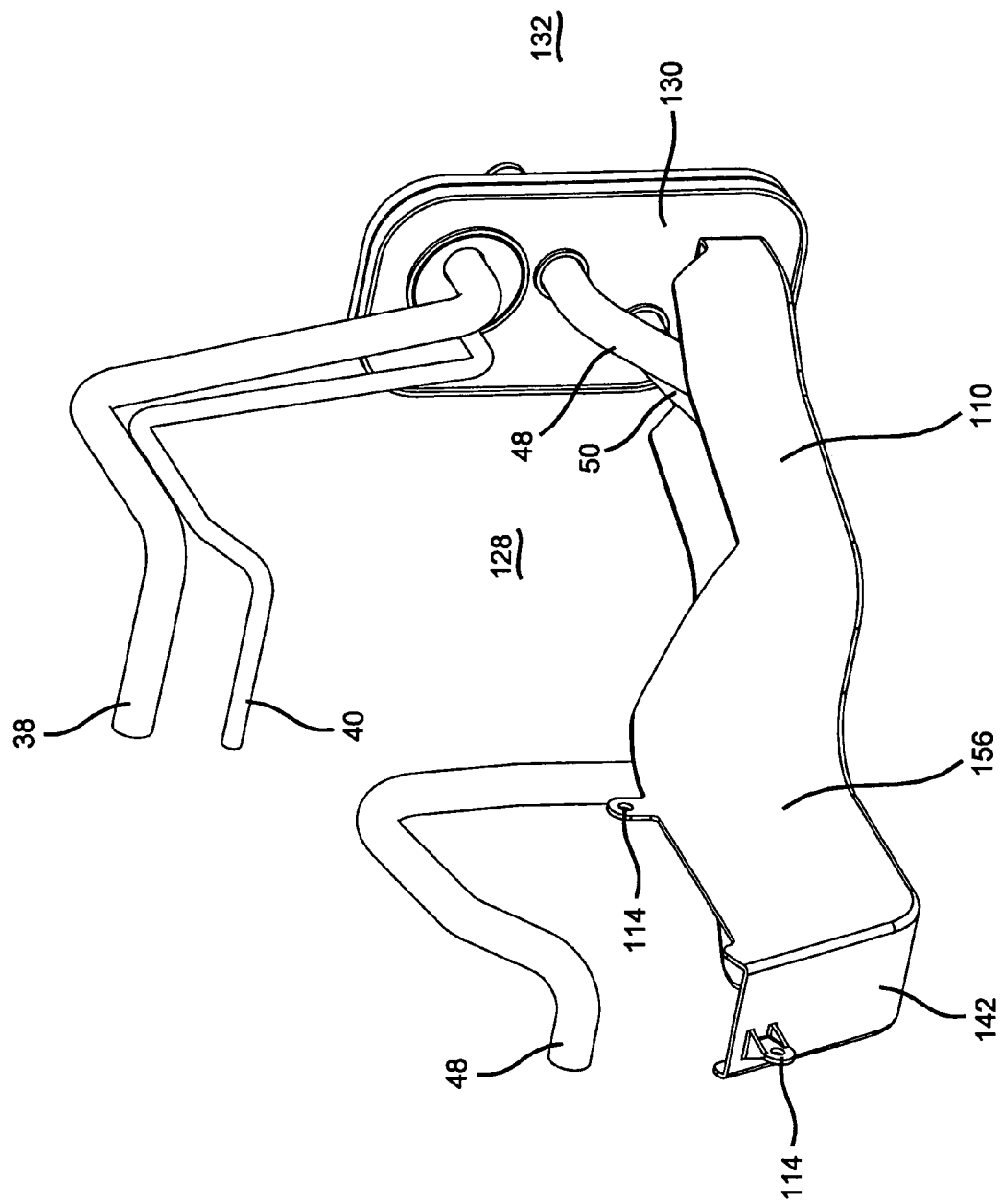
FIG. 4 is a passenger side perspective view of the drain tray shown with the inlet and outlet pipes of the heater core and the evaporator.
Figure 5:
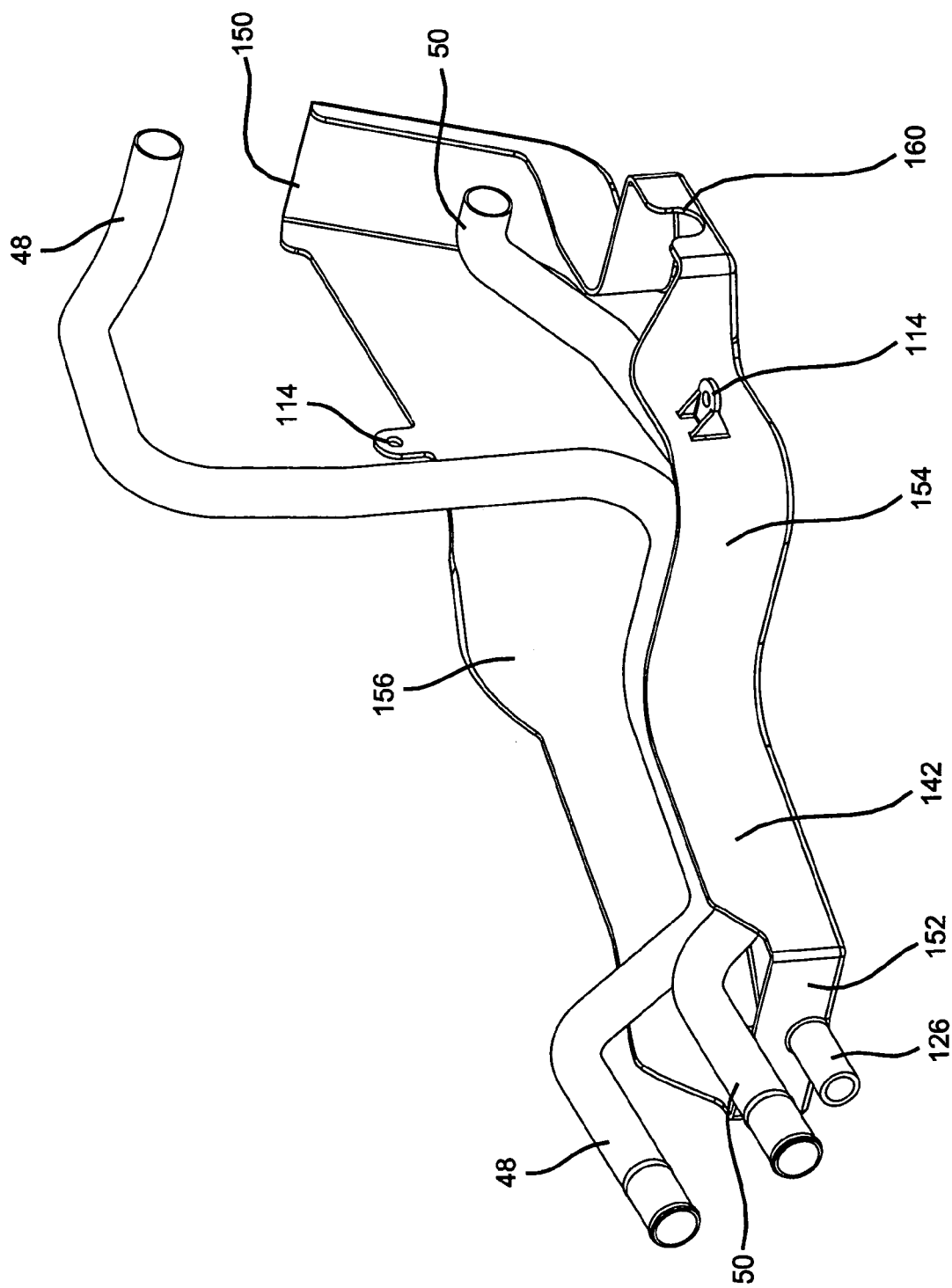
FIG. 5 is a driver side perspective view of the drain tray shown with the inlet and outlet pipes of the heater core and the evaporator.

With continued reference to FIGS. 2 and 3 and further reference to FIGS. 4 and 5, the drain tray 110 will be described in greater detail. The drain tray 110 is located in the passenger compartment 128 adjacent to a dash panel 130 (FIG. 4). The dash panel 130 separates the passenger compartment 128 from an engine compartment 132. The drain tray 110 generally includes a planar portion 140 (FIG. 6) bounded by a wall 142 extending around the perimeter of the drain tray 110. The wall 142 extends at varying heights around the train tray 110 for mating with convenient locations on the HVAC case 42 while accommodating portions of the inlet and outlet pipes 48 and 50.

The wall 142 is further defined by a fore wall 150, an aft wall 152, a driver side wall 154 and a passenger side wall 156. The fore wall 150 is generally sloped from the front to the rear (best shown in FIGS. 3 and 5). The aft wall 152 is positioned proximate to the dash panel 130 and incorporates the drain tube 126. The driver side wall 154 incorporates a relief 160 for accommodate the evaporator drain tube 120 (FIG. 5). The driver side wall 154 further accommodates a ramped extension portion 162 (FIG. 6) for accepting condensation flowing out of the drain pipe 120. The ramped extension portion 162 directs fluid onto the planar portion 140.

The passenger side wall 156 is raised with respect to the remaining walls of the tray 110 (FIG. 4) to provide increased protection to an occupant of the passenger seat of the vehicle. As a whole, the passenger side wall 156, the fore wall 150 and the planar portion 140 of the drain tray 110 cooperate to provide a barrier between an occupant and the inlet and outlet pipes 148 and 150 of the heater core 46. As such, inadvertent contact between the legs or other areas of an occupant and the inlet and outlet pipes 148 and 150 is minimized.

The drain tray 110 is comprised of rigid material such as plastic. The drain tray 110 may be formed by conventional techniques such as, but not limited to, injection molding. The geometry of the drain tray 110 is dictated by the configuration of the HVAC case 42 and the inlet and outlet pipes 48 and 50 of a particular automobile.

Those skilled in the art can now appreciate from the foregoing description that the broad teachings of the present invention can be implemented in a variety of forms. For example, although the drain tray 110 is shown in cooperation with a specific HVAC case, it is appreciated that the drain tray may be shaped differently to accommodate alternate heater core pipes and HVAC cases. Therefore, while this invention has been described in connection with particular examples thereof, the true scope of the invention should not be so limited since other modifications will become apparent to the skilled practitioner upon a study of the drawings, the specification and the following claims.

What is claimed is:

1. A mounting arrangement for an automobile heating core, the automobile having a dash panel defining a boundary between a passenger compartment and an engine compartment comprising:
   an inlet pipe extending between the dash panel and the heating core for delivering fluid to the heating core;
   an outlet pipe extending between the dash panel and the heating core for delivering fluid away from the heating core; and
   a fluid collection member positioned in said passenger compartment and arranged to collect fluid leaking from said inlet and outlet pipes.

2. The mounting arrangement of claim 1, further comprising:
   an evaporator disposed in said passenger compartment and having a drain tube extending therefrom for delivering condensation away from said evaporator and to said fluid collection member.

3. The mounting arrangement of claim 2 wherein said fluid collection member includes a planar portion and a wall extending around a perimeter thereof.

4. The mounting arrangement of claim 3 wherein said wall includes an opening for accommodating said drain tube of said evaporator.

5. The mounting arrangement of claim 1 wherein said fluid collection member includes an outlet port for draining fluid away from said fluid collection member.

6. The mounting arrangement of claim 5 wherein said outlet port extends through the dash panel for directing fluid from said passenger compartment to said engine compartment.

7. The mounting arrangement of claim 1 wherein said fluid collection member is disposed generally below said passenger compartment pipes whereby gravity influences leaking fluid into said fluid collection member.

8. An HVAC arrangement for an automobile comprising:
a dash panel defining a boundary between a passenger compartment and an engine compartment;
an HVAC case disposed in said passenger compartment and containing a heating core therein;
an inlet and outlet pipe extending in said passenger compartment from said heater core to said dash panel; and
a fluid collection member coupled to said HVAC case and positioned between a vehicle occupant and said inlet and outlet pipes to preclude contact of said occupant and said inlet and outlet pipes, said fluid collection member arranged to collect fluid leaking from said inlet and outlet pipe and carry said fluid from said passenger compartment to said engine compartment.

9. The mounting arrangement of claim 8, further comprising:
an evaporator disposed in said passenger compartment and having a drain tube extending therefrom for delivering condensation away from said evaporator and to said fluid collection member.

10. The mounting arrangement of claim 9 wherein said fluid collection member includes a planar portion and a wall extending around a perimeter thereof, said wall further presenting a raised portion extending between an occupant and said inlet and outlet pipes to minimize contact between said occupant and said inlet and outlet pipes.

11. The mounting arrangement of claim 10 wherein said wall includes an opening for receiving said drain tube of said evaporator.

12. The mounting arrangement of claim 8 wherein said fluid collection member includes an outlet port for draining fluid away from said fluid collection member.

13. The mounting arrangement of claim 12 wherein said outlet port extends through said dash panel.

14. The mounting arrangement of claim 8 wherein said fluid collection member is disposed generally below said passenger compartment pipes whereby gravity influences leaking fluid into said fluid collection member.

15. An HVAC system for an automobile comprising:
a dash panel defining a boundary between a passenger compartment and an engine compartment;
an inlet pipe disposed in said passenger compartment and carrying fluid to a heater core;
an outlet pipe disposed in said passenger compartment and carrying fluid away from said heater core; and
a tray arranged in said passenger compartment proximate to said inlet and outlet pipes and configured to collect fluid escaping from said pipes and directing said fluid from said passenger compartment to said engine compartment.

16. The HVAC system of claim 15 wherein said tray is positioned between a vehicle occupant and said pipes for precluding contact of said pipes by said vehicle occupant.

17. The HVAC system of claim 15, further comprising:
an evaporator located proximate to said pipes and having a drain tube extending therefrom for delivering condensation away from said evaporator and to said tray, said evaporator including an inlet pipe and an outlet pipe, said tray configured to collect fluid leaking from said evaporator inlet and outlet pipes.

18. The HVAC system of claim 17 wherein said tray includes a planar portion and a wall extending around a perimeter thereof, said wall having an opening for receiving said drain tube of said evaporator.

19. The HVAC system of claim 15 wherein said tray includes an outlet port extending through said dash panel for draining fluid from said tray and into said engine compartment.

20. The HVAC system of claim 15 wherein said tray is disposed generally below said pipes whereby gravity influences fluid escaping from said pipes into said tray.

* * * * *